(12) United States Patent
Chidlovskii et al.

(10) Patent No.: US 12,217,484 B2
(45) Date of Patent: Feb. 4, 2025

(54) METHOD OF UNSUPERVISED DOMAIN ADAPTATION IN ORDINAL REGRESSION

(71) Applicant: Naver Corporation, Seongnam-si (KR)

(72) Inventors: Boris Chidlovskii, Meylan (FR); Assem Sadek, Meylan (FR)

(73) Assignee: Naver Corporation (KR)

(*) Notice: Subject to any disclaimer, the term of this patent is extended or adjusted under 35 U.S.C. 154(b) by 345 days.

(21) Appl. No.: 17/737,114

(22) Filed: May 5, 2022

(65) Prior Publication Data

US 2023/0196733 A1      Jun. 22, 2023

Related U.S. Application Data

(60) Provisional application No. 63/294,112, filed on Dec. 28, 2021, provisional application No. 63/290,230, filed on Dec. 16, 2021.

(51) Int. Cl.
  *G06V 10/77*       (2022.01)
  *G06V 10/774*      (2022.01)
  *G06V 10/778*      (2022.01)
  *G06V 10/82*       (2022.01)

(52) U.S. Cl.
  CPC ...... *G06V 10/7715* (2022.01); *G06V 10/7753* (2022.01); *G06V 10/7792* (2022.01); *G06V 10/7796* (2022.01); *G06V 10/82* (2022.01)

(58) Field of Classification Search
  CPC ........... G06V 10/7715; G06V 10/7796; G06V 10/82; G06V 10/7792; G06V 10/7753
  See application file for complete search history.

(56) References Cited

U.S. PATENT DOCUMENTS

| | | | | |
|---|---|---|---|---|
| 10,354,199 | B2* | 7/2019 | Clinchant | G06N 5/02 |
| 11,188,795 | B1* | 11/2021 | Lee | G06F 18/217 |
| 11,482,000 | B2* | 10/2022 | Agarwal | G06T 7/11 |
| 11,494,660 | B2* | 11/2022 | Chidlovskii | G06V 10/764 |
| 11,714,831 | B2* | 8/2023 | Makhija | G06V 30/40 |
| | | | | 706/20 |

(Continued)

OTHER PUBLICATIONS

Cao, Wenzhi, Vahid Mirjalili, and Sebastian Raschka. 'Rank Consistent Ordinal Regression for Neural Networks'. 2020.

(Continued)

*Primary Examiner* — Gregory M Desire
(74) *Attorney, Agent, or Firm* — Dawson Law Firm, P.C.; Michael J. Nickerson

(57) ABSTRACT

A method of jointly training of a transferable feature extractor network, an ordinal regressor network, and an order classifier network in an ordinal regression unsupervised domain adaption network by providing a source of labeled source images and unlabeled target images; outputting image representations from a transferable feature extractor network by performing a minimax optimization procedure on the source of labeled source images and unlabeled target images; training a domain discriminator network, using the image representations from the transferable feature extractor network, to distinguish between source images and target images; training an ordinal regressor network using a full set of source images from the transferable feature extractor network; and training an order classifier network using a full set of source images from said transferable feature extractor network.

12 Claims, 13 Drawing Sheets

(56) References Cited

U.S. PATENT DOCUMENTS

| | | | |
|---|---|---|---|
| 11,734,390 B2* | 8/2023 | Yin | G06N 3/088 |
| | | | 382/157 |
| 11,741,572 B2* | 8/2023 | Yin | G06N 3/08 |
| | | | 345/619 |

OTHER PUBLICATIONS

Cao, Zhangjie, Mingsheng Long, Jianmin Wang, and Michael I. Jordan. 'Partial Transfer Learning with Selective Adversarial Networks'. In 2018 IEEE/CVF Conference on Computer Vision and Pattern Recognition, 2724-32. Salt Lake City, UT: IEEE, 2018.

Cao, Zhangjie, Lijia Ma, Mingsheng Long, and Jianmin Wang. 'Partial Adversarial Domain Adaptation', 135-50, 2018.

Cao, Zhangjie, Kaichao You, Mingsheng Long, Jianmin Wang, and Qiang Yang. 'Learning to Transfer Examples for Partial Domain Adaptation'. In 2019 IEEE/CVF Conference on Computer Vision and Pattern Recognition (CVPR), 2980-89. Long Beach, CA, USA: IEEE, 2019.

Cattelan, Manuela. 'Models for Paired Comparison Data: A Review with Emphasis on Dependent Data'. Statistical Science 27, Aug. 2012.

Chen, Bor-Chun, Chu-Song Chen, and Winston H. Hsu. 'Cross-Age Reference Coding for Age-Invariant Face Recognition and Retrieval'. In Computer Vision—ECCV 2014, edited by David Fleet, Tomas Pajdla, Bernt Schiele, and Tinne Tuytelaars, 8694:768-83. Lecture Notes in Computer Science. Cham: Springer International Publishing, 2014.

Chen, Xiangli, Mathew Monfort, Anqi Liu, and Brian D. Ziebart. 'Robust Covariate Shift Regression'. In Artificial Intelligence and Statistics, 1270-79. PMLR, 2016.

Chidlovskii, Boris, and Assem Sadek. 'Adversarial Transfer of Pose Estimation Regression'. ArXiv:2006.11658 [Cs], Nov. 23, 2020.

Cortes, Corinna, and Mehryar Mohri. 'Domain Adaptation in Regression', 2011.

Courty, Nicolas, Rémi Flamary, Devis Tuia, and Alain Rakotomamonjy. 'Optimal Transport for Domain Adaptation'. IEEE Transactions on Pattern Analysis and Machine Intelligence, 2016.

Csurka, Gabriela. 'Domain Adaptation for Visual Applications: A Comprehensive Survey'. ArXiv:1702.05374 [Cs], Mar. 30, 2017.

Diaz, Raul, and Amit Marathe. 'Soft Labels for Ordinal Regression'. In 2019 IEEE/CVF Conference on Computer Vision and Pattern Recognition (CVPR), 4733-42. Long Beach, CA, USA: IEEE, 2019.

Fu, Huan, Mingming Gong, Chaohui Wang, Kayhan Batmanghelich, and Dacheng Tao. 'Deep Ordinal Regression Network for Monocular Depth Estimation'. In IEEE Conference on Computer Vision and Pattern Recognition (CVPR). Salt Lake City, United States, 2018.

Ganin, Yaroslav, Evgeniya Ustinova, Hana Ajakan, Pascal Germain, Hugo Larochelle, François Laviolette, Mario Marchand, and Victor Lempitsky. 'Domain-Adversarial Training of Neural Networks'. Domain Adaptation in Computer Vision Applications, edited by Gabriela Csurka, 189-209. Advances in Computer Vision and Pattern Recognition. Cham: Springer International Publishing, 2017.

Hoffman, Judy, Erik Rodner, Jeff Donahue, Trevor Darrell, and Kate Saenko. 'Efficient Learning of Domain-Invariant Image Representations'. ArXiv:1301.3224 [Cs], Apr. 8, 2013.

Hu, Lanqing, Meina Kan, Shiguang Shan, and Xilin Chen. 'Unsupervised Domain Adaptation With Hierarchical Gradient Synchronization'. In 2020 IEEE/CVF Conference on Computer Vision and Pattern Recognition (CVPR), 4042-51. Seattle, WA, USA: IEEE, 2020.

Li, Mengxue, Yi-Ming Zhai, You-Wei Luo, Peng-Fei Ge, and Chuan-Xian Ren. 'Enhanced Transport Distance for Unsupervised Domain Adaptation'. In 2020 IEEE/CVF Conference on Computer Vision and Pattern Recognition (CVPR), 13933-41. Seattle, WA, USA: IEEE, 2020.

Li, Yitong, Michael Murias, Samantha Major, Geraldine Dawson, and David Carlson. 'On Target Shift in Adversarial Domain Adaptation'. In the 22nd International Conference on Artificial Intelligence and Statistics, 616-25. PMLR, 2019. http://proceedings.mlr.press/v89/li19b.html.

Liang, Jian, Yunbo Wang, Dapeng Hu, Ran He, and Jiashi Feng. 'A Balanced and Uncertainty-Aware Approach for Partial Domain Adaptation'. In Computer Vision—ECCV 2020, edited by Andrea Vedaldi, Horst Bischof, Thomas Brox, and Jan-Michael Frahm, 12356:123-40. Lecture Notes in Computer Science. Cham: Springer International Publishing, 2020.

Lim, Kyungsun, Nyeong-Ho Shin, Young-Yoon Lee, and Chang-Su Kim. 'Order Learning and Its Application to Age Estimation', 2019.

Long, Mingsheng, Yue Cao, Jianmin Wang, and Michael Jordan. 'Learning Transferable Features with Deep Adaptation Networks'. In International Conference on Machine Learning, 97-105. PMLR, 2015.

Long, Mingsheng, Jianmin Wang, Guiguang Ding, Jiaguang Sun, and Philip S. Yu. 'Transfer Joint Matching for Unsupervised Domain Adaptation'. In 2014 IEEE Conference on Computer Vision and Pattern Recognition, 1410-17. Columbus, OH, USA: IEEE, 2014.

Niu, Zhenxing, Mo Zhou, Le Wang, Xinbo Gao, and Gang Hua. 'Ordinal Regression with Multiple Output CNN for Age Estimation'. In 2016 IEEE Conference on Computer Vision and Pattern Recognition (CVPR), 4920-28. Las Vegas, NV, USA: IEEE, 2016.

Pan, Yingwei, Ting Yao, Yehao Li, Chong-Wah Ngo, and Tao Mei. 'Exploring Category-Agnostic Clusters for Open-Set Domain Adaptation'. In 2020 IEEE/CVF Conference on Computer Vision and Pattern Recognition (CVPR), 13864-72. Seattle, WA, USA: IEEE, 2020.

Pang, Guansong, Cheng Yan, Chunhua Shen, Anton van den Hengel, and Xiao Bai. 'Self-Trained Deep Ordinal Regression for End-to-End Video Anomaly Detection', 12173-82, 2020.

Proakis, John, Manolakis DimitrisDigital Signal Processing—principles, algorithms and applications (4.ed.). Macmillan, 1992.

Saito, Kuniaki, Shohei Yamamoto, Yoshitaka Ushiku, and Tatsuya Harada. 'Open Set Domain Adaptation by Backpropagation'. In Computer Vision—ECCV 2018, edited by Vittorio Ferrari, Martial Hebert, Cristian Sminchisescu, and Yair Weiss, 11209:156-71. Lecture Notes in Computer Science. Cham: Springer International Publishing, 2018.

Shrivastava, Ashish, Tomas Pfister, Oncel Tuzel, Joshua Susskind, Wenda Wang, and Russell Webb. 'Learning from Simulated and Unsupervised Images through Adversarial Training'. In 2017 IEEE Conference on Computer Vision and Pattern Recognition (CVPR), 2242-51. Honolulu, HI: IEEE, 2017.

Sun, Baochen, Jiashi Feng, and Kate Saenko. 'Return of Frustratingly Easy Domain Adaptation'. ArXiv:1511.05547 [Cs], Dec. 9, 2015.

Torralba, Antonio, and Alexei A. Efros. 'Unbiased Look at Dataset Bias'. In CVPR 2011, 1521-28. Colorado Springs, CO, USA: IEEE, 2011.

Tzeng, Eric, Judy Hoffman, Kate Saenko, and Trevor Darrell. 'Adversarial Discriminative Domain Adaptation'. In 2017 IEEE Conference on Computer Vision and Pattern Recognition (CVPR), 2962-71. Honolulu, HI: IEEE, 2017.

Xu, Renjun, Pelen Liu, Liyan Wang, Chao Chen, and Jindong Wang. 'Reliable Weighted Optimal Transport for Unsupervised Domain Adaptation', 4394-4403, 2020.

Xu, Yichong, Hariank Muthakana, Sivaraman Balakrishnan, Artur Dubrawski, and Aarti Singh. 'Nonparametric Regression with Comparisons: Escaping the Curse of Dimensionality with Ordinal Information', In ICML, 5469-78, 2018.

You, Kaichao, Mingsheng Long, Zhangjie Cao, Jianmin Wang, and Michael I. Jordan. 'Universal Domain Adaptation', 2720-29, 2019.

Zhang, Jing, Zewei Ding, Wanqing Li, and Philip Ogunbona. 'Importance Weighted Adversarial Nets for Partial Domain Adaptation', 8156-64, 2018.

Zhang, Yang, Philip David, and Boqing Gong. 'Curriculum Domain Adaptation for Semantic Segmentation of Urban Scenes', 2020-30, 2017.

Zhang, Zhifei, Yang Song, and Hairong Qi. 'Age Progression/Regression by Conditional Adversarial Autoencoder', 5810-18, 2017.

(56) References Cited

OTHER PUBLICATIONS

Zhao, Sicheng, Xiangyu Yue, Shanghang Zhang, Bo Li, Han Zhao, Bichen Wu, Ravi Krishna, et al. 'A Review of Single-Source Deep Unsupervised Visual Domain Adaptation'. ArXiv:2009.00155 [Cs, Eess], Sep. 18, 2020.

* cited by examiner

FIGURE 12

| Task | AFAD→UTKFace [15-40]→[1-30] | AFAD→UTKFace [15-40]→[1-80] | UTKFace→AFAD [1-80]→[15-40] | AFAD→UTKFace [15-40]→[15-40] |
|---|---|---|---|---|
| Configuration | OSPA ($\xi = 0.38$) | OS ($\xi = 0.15$) | PA ($\xi = 0.31$) | SC ($\xi = 1.0$) |
| No adaptation | 3.39 / 3.37 | 9.87 / 11.62 | 5.20 / 8.44 | 3.37 / 5.01 |
| UDA [ ] | 3.38 / 3.35 | 9.75 / 11.51 | 5.22 / 8.34 | 3.38 / 4.74 |
| ORUDA | 3.38 / 3.23 | 7.70 / 9.55 | 4.88 / 5.39 | 3.38 / 4.70 |
| Supervised | 3.40 / 3.37 | 4.91 / 5.30 | 5.20 / 3.39 | 3.37 / 4.37 |

FIGURE 13

| Task | AFAD→CACD [15-40]→[15-62] | CACD→AFAD [15-62]→[15-40] | AFAD→CACD [15-40]→[15-40] | CACD→AFAD [15-40]→[15-40] |
|---|---|---|---|---|
| Configuration | OS ($\xi = 0.53$) | PA ($\xi = 0.53$) | SC ($\xi = 1.0$) | SC ($\xi = 1.0$) |
| No adaptation | 3.37 / 15.82 | 6.55 / 18.89 | 3.37 / 8.72 | 4.40 / 7.42 |
| ORUDA | 3.34 / 12.43 | 5.83 / 10.31 | 3.34 / 7.16 | 4.38 / 6.19 |
| Supervised | 3.37 / 6.55 | 6.55 / 3.37 | 3.37 / 6.55 | 4.40 / 3.37 |

| Task | CACD→UTKFace [15-62]→[1-50] | CACD→UTKFace [15-62]→[30-80] | UTKFace→CACD [1-80]→[15-62] | |
|---|---|---|---|---|
| Configuration | OSPA ($\xi = 0.38$) | OS ($\xi = 0.40$) | PA ($\xi = 0.40$) | SC ($\xi = 1.0$) |
| No adaptation | 5.86 / 9.87 | 5.86 / 10.79 | 5.86 / 19.53 | 3.39 / 13.32 |
| ORUDA | 5.88 / 7.88 | 5.91 / 8.50 | 5.94 / 11.12 | 3.38 / 9.75 |
| Supervised | 5.86 / 5.33 | 5.86 / 6.72 | 5.86 / 5.20 | 3.39 / 4.33 |

| Model | e-MAE |
|---|---|
| ORUDA with binary filter | 9.07 |
| ORUDA w/o CL | 8.11 |
| ORUDA w/o BL | 7.92 |
| ORUDA | 7.70 |

FIGURE 14

METHOD OF UNSUPERVISED DOMAIN ADAPTATION IN ORDINAL REGRESSION

PRIORITY INFORMATION

The present application claims priority, under 35 USC § 119(e), from U.S. Provisional Patent Application, Ser. No. 63/290,230, filed on Dec. 16, 2021. The entire content of U.S. Provisional Patent Application, Ser. No. 63/290,230, filed on Dec. 16, 2021, is hereby incorporated by reference.

The present application claims priority, under 35 USC § 119(e), from U.S. Provisional Patent Application, Ser. No. 63/294,112, filed on Dec. 28, 2021. The entire content of U.S. Provisional Patent Application, Ser. No. 63/294,112, filed on Dec. 28, 2021, is hereby incorporated by reference.

BACKGROUND

Deep neural networks have achieved significant progress in various computer vision tasks where large-scale labeled training data are available. However, in many applications, manual annotation is time-consuming and a large amount of labels are hard to obtain. An alternative solution consists in training a model on a related annotated large-scale source domain and applying it to the unlabeled target domain. However, due to the presence of domain shift, such a direct transfer might not perform well.

Domain adaptation techniques were introduced to address the domain shift between source and target domains. Domain adaptation is a form of transfer learning that aims to learn a model from a labeled source domain that can generalize well to a different (but related) unlabeled or sparsely labeled target domain. Domain adaptation has demonstrated a significant success in various applications, including image classification, object recognition and semantic segmentation, object detection, 3D point cloud segmentation, etc. These successes are due to the same semantic space shared by source and target domains.

The common class set implicitly structures the output space, where separation between two classes in the source can be transferred to the target. Moreover this knowledge makes possible totally unsupervised domain adaptation.

More realistic but more challenging problems of partial and open set domain adaptation have been recently addressed. In universal domain adaptation, source and target domains share a set of common classes but each domain may have its private part. The task is to identify source and target images in common classes to apply domain adaptation. Most universal domain adaptation methods assume that classes form clusters and count on entropy-based criteria to weigh down images estimated as being in private source classes or target clusters.

Domain adaptation for regression tasks is less studied and represented by eye gaze and hand pose estimation. In both tasks, a model trained on synthetically generated images is transferred to real images by adjusting the loss function or by reweighting source images. The process of generating synthetic images ensures the same output space across the domains and prevents any output shift.

The universal domain adaptation problem in ordinal regression is a middle point between classification and metric regression. Ordinal regression aims to solve a classification problem where classes are not independent but follow a natural order, like age, depth, or human preference. Splitting ordinal data in classes is a subject of common agreement, with no low density regions separating the classes.

Domain adaptation in ordinal regression is exposed to the same two challenges as in classification. If source and target domains share the same classes, many existing domain adaptation solutions can be adopted by replacing the cross entropy loss with the ordinal regression loss.

However, domain shift in ordinal regression often includes output shift. Consider the example of domain shift in human face age estimation. UTKFace and AFAD are two popular datasets for training age estimation models. AFAD (Asian Face Age Dataset) is a collection of Asian face images aged between 15 and 40 years old; UTKFace is a face dataset with the age range from 1 to 80 years.

The domain shift combines the input shift (faces of different human races) and output shift (ages). A model trained on UTKFace and adopted to AFAD should be able to constrain estimations to the target age range. Inversely, a model trained on AFAD and adopted to UTKFace should be able to detect extra classes and make predictions beyond the source age range.

Conventional universal domain adaptation methods, proposed for classification, perform poorly in this case as the clustering assumption does not hold. This confuses the entropy-based criteria proposed to separate common and private images and leads to negative transfer.

Accordingly, it is desirable to implement a universal domain adaptation method that avoids poor classification performance.

It is also desirable to implement a universal domain adaptation method that does not confuse the entropy-based criteria proposed to separate common and private images, thereby avoiding negative transfer.

It is further desirable to utilize a manifold-based approach to domain adaptation in ordinal regression.

BRIEF DESCRIPTION OF THE DRAWINGS

The drawings are only for purposes of illustrating various embodiments and are not to be construed as limiting, wherein:

FIG. 12 is a table showing the evaluation results for AFAD→UTKFace domains;

FIG. 13 is a table showing the evaluation results for the domain pairs: AFAD-CACD and UTKFace-CACD;

FIG. 14 is a table showing e-MAE on ablation study for UTKFace-AFAD task;

FIG. 16 15 represents graphical representations of TSN-E projections for AFAD [15-40] to UTKFace [0-40] adaptation.

DETAILED DESCRIPTION

Figure 1:
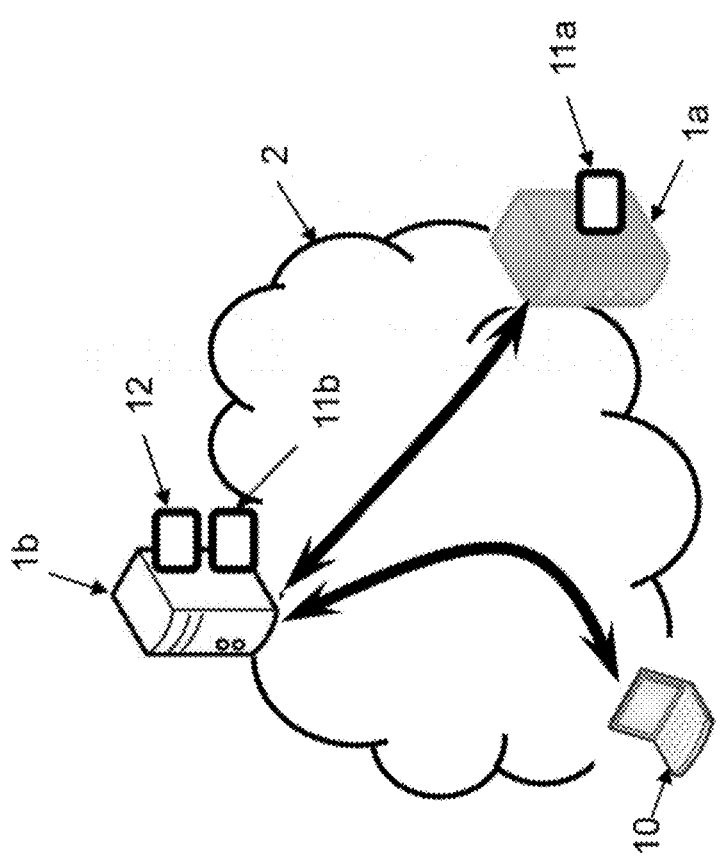
FIG. 1 illustrates an example of architecture for a method of training and a method of re-identification.

The methods described below are implemented within an architecture such as illustrated in FIG. 1, by means of a first and/or second server 1a, 1b. The first server 1a is the learning server (implementing the first method) and the second server 1b is a person re-identification server (implementing the second method). It is fully possible that these two servers may be merged.

Each of these servers 1a, 1b is typically remote computer equipment connected to an extended network 2 such as the Internet for data exchange. Each server 1a, 1b comprises data processing means 11a, 11b and optionally storage means 12 such as a computer memory; e.g., a hard disk.

The memory 12 of the first server 1a stores a training database; i.e., a set of already identified data (as opposed to so-called inputted data that precisely is sought to be identified).

The architecture comprises one or more items of client equipment 10, which may be any workstation (also connected to network 2), preferably separate from the servers 1a, 1b but possibly being merged with one and/or the other thereof. The client equipment 10 has one or more data items to be identified. The operators of the equipment are typically "clients" in the commercial meaning of the term, of the service provider operating the first and/or second servers 1a, 1b.

The following describes a manifold-based approach to domain adaptation (DA) in ordinal regression. In the description, it is assumed that ordinal instances live in a low dimensional manifold where classes form a natural order.

Figure 2:
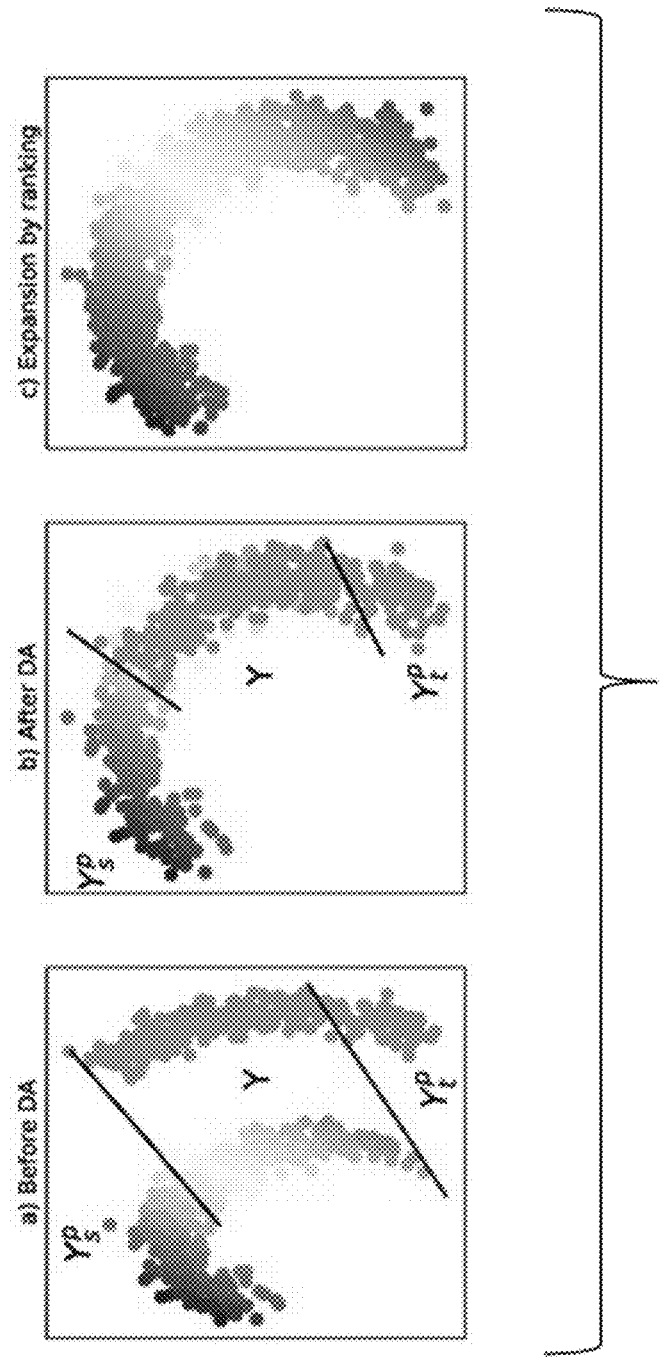
FIG. 2 represents a graphical representation of universal domain adaptation on a manifold: Y is common, $Y_s^P$ and $Y_t^P$ are private source and target parts.

If trained separately with domain specific features, source and target domains form two separate manifolds, as seen in graphic a) of FIG. 2 (Before DA). The gap between the manifolds makes the source model perform poorly in the target domain. By learning domain-invariant representations, domain adaptation can make image features domain invariant, thus forming one unique manifold, as seen in graphic b) of FIG. 2 (After DA), where each domain contributes with its common and private parts. However the method should be able to detect common and private parts and to train the domain discriminator on the common part only.

An auxiliary task of order learning is introduced, which serves for learning a complementary representation of the ordinal regression task.

In terms of the manifold, ordinal regression provides absolute position, while the order provides relative positions. First, the order model can help to determine the private source and target images and exclude them when training the domain discriminator to reduce the domain gap.

Second, the common manifold structure is beneficial in predicting the relative position of private target images on the manifold. Predicting exact classes requires some target labels and is beyond the unsupervised domain adaptation setup. However, by assuming homogeneity of relative positions, classes from the common space can be expanded to the private space by ranking on the manifold, as seen in graphic c) of FIG. 2 (Expansion by ranking).

Trained on source image pairs, the order model can suffer from the negative transfer to target, just as the ordinal regression does. Thus, to address this issue, a neural model for universal domain adaptation, which jointly learns ordinal regression, the order relationship and domain invariant features through a domain discriminator, is used to leverage the learned order relationships in particular to rank private target images.

As discussed in more detail below, existing universal domain adaptation methods for classification behave suboptimally on ordinal regression tasks. Thus, the existing universal domain adaptation methods have been revised, wherein the universal domain adaptation method complements order regression with order relationship learning.

The model is trained using pairwise comparisons in order to detect images in private source and target parts. The ordinal regression nature enables the labeling of all private target images by ranking them with respect to the common part.

There are multiple families of solutions for domain adaptation. Feature-level strategies focus on learning domain invariant data representations mainly by minimizing different domain shift measures. Discrepancy-based methods explicitly measure the discrepancy between the source and target domains on corresponding activation layers of the two network streams.

Domain adversarial training of neural networks have also been used to learn domain invariant and task discriminative representations. Adversarial discriminative models employ an adversarial objective with respect to a domain discriminator to encourage domain confusion. This approach has multiple variants, some of which also exploit class-specific and group-specific domain recognition components.

Another family of domain adaptation methods uses optimal transport models to align the representations of the source and target domains To obtain the optimal distribution matching, weighted optimal transport strategies have been utilized.

In partial domain adaptation, the target is allowed to cover only a subset of the source class set. In this case, the adaptation process should be adjusted so that the samples with not-shared labels would not influence the learned model. The more commonly used techniques add a re-weight source sample strategy to a standard domain adaptation approach. Alternative solutions leverage two separate deep classifiers and their prediction inconsistency on feature norm matching or include adversarial alignment and adaptive uncertainty suppression.

The open set scenario in domain adaptation is not trivial since the target samples in unknown class are not expected to align with the source. This problem can be addressed by measuring the entropy of class predictions or by augmenting the domain adaptation with class-agnostic clusters in target domain.

In another example, a method to model the synchronization relationship among the local distribution pieces and global distribution has been utilized, aiming for more precise domain-invariant features in hierarchical manner, by combining class-wise, group-wise and global alignments.

Ordinal regression resembles a mixture of traditional regression of real-valued metrics, and independent, multi-class classification problems. The goal is to predict the category of an input instance from a discrete set of classes which are related in a natural order. Common examples of such tasks are movie ratings, customer satisfaction surveys, age estimation, etc.

Ordinal regression attempts to solve classification problems in which not all wrong classes are equally wrong. In the age estimation example, if a particular person is 25 years old, estimation of the age of 30 years is less incorrect than the estimation of 40 years.

Recent methods frame the ordinal regression problem as classification with a set of thresholds on the output space. In deep learning, an ordinal regression convolutional neural network reduces ordinal regression to binary classification. In this approach, an ordinal regression problem with m classes is transformed into m−1 binary classification problems, with the k-th classifier predicting whether the age label of a face image exceeds rank $r_k$, k=1, . . . , m−1. While the binary classification approach is able to achieve state-of-the-art performance, it does not guarantee consistent predictions, such that predictions for individual binary tasks may disagree. This inconsistency leads to sub-optimal performance when the m−1 task predictions are combined to obtain the estimated age.

The consistent rank logits method addresses the inconsistency issue and provides a theoretical guarantee for classifier consistency without increasing training complexity. Using the binary classifier responses, the predicted class for an input x is obtained by:

$$h(x) = y_q, q = 1 + \sum_{k=1}^{m-1} f_k(x),$$

where $f_k(x) \in \{0,1\}$ is the prediction of the k-th binary classifier in the output layer. Classifiers $f_k$, k=1 . . . m−1 are required to reflect the ordinal information and to be rank-monotonic, $f_1(x) > f_2(x) > \ldots > f_{m-1}(x)$, which guarantees consistent predictions.

To achieve rank-monotonicity and guarantee binary classifier consistency, the m−1 binary tasks share the same intermediate layers but are assigned distinct weight parameters in the output layer. The Coral loss is the weighted cross-entropy of m−1 binary classifiers.

The problem of universal domain adaptation in ordinal regression is addressed, where a source domain $D_s = \{(x^i_s, y^i_s)\}$ consisting of $n_s$ labeled samples and a target domain $D_t = (x^i_t)$ of $n_t$ unlabeled samples are provided at training. $Y_s$ is used to denote $m_s$ classes of source domain, $Y_s = (y_{s1}, y_{s1}+1, \ldots, y_{s1}+m_s-1)$, and $Y_t$ to denote $m_t$ classes of target domain, $Y_t = (y_{t1}, y_{t1}+1, \ldots, y_{t1}+m_t-1)$.

The set of common classes shared by both domains is denoted $Y = Y_s \cap Y_t$. Private classes in source and target domains are denoted $Y^p_s = Y_s \setminus Y$ and $Y^p_t = Y_t \setminus Y$. Target data is fully unlabeled, the target class set is only used for defining the universal domain adaptation problem. The commonness is defined between two domains as the Jaccard distance of two class sets, $\xi = |Y_a \cap Y_t| / |Y_a \cup Y_t|$.

Same class set domain adaptation is a special case of universal domain adaptation when $\xi = 1$. The smaller $\xi$ is, the less knowledge is shared and the more difficult adaptation becomes. The task is to design a model that works well across a wide spectrum of $\xi$. It needs to be able to distinguish between target data coming from the common set Y and private set $Y^p_t$.

Figure 3:
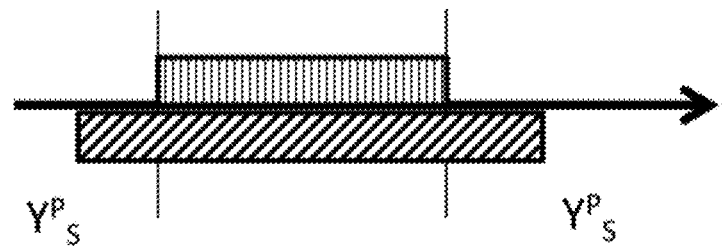
FIGS. 3-6 represent a graphical representation of universal domain adaptation configurations in ordinal regression according to label space overlap.
Figure 4:
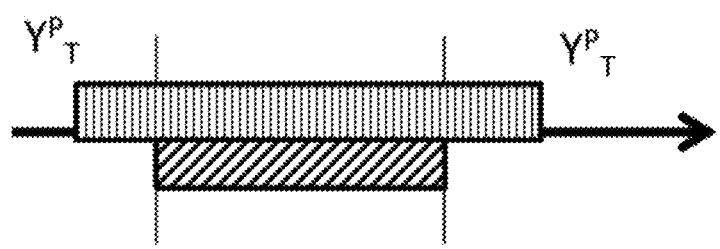
Figure 5:
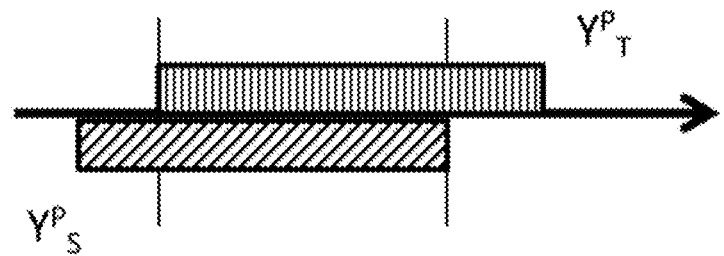
Figure 6:
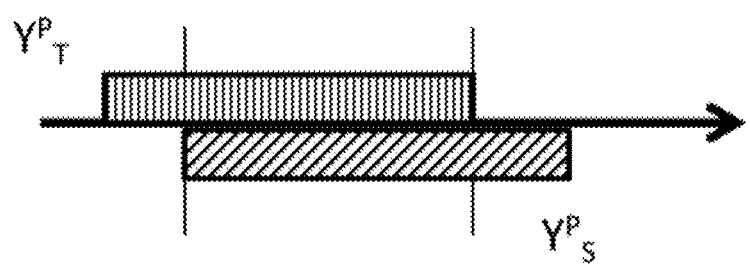

It is assumed that $\xi > 0$ and therefore the common class set Y is not empty. FIGS. 3-6 show four possible configurations of universal domain adaptation. FIG. 3 illustrates partial domain adaptation (PA) when $Y^p_t = \emptyset$. FIG. 4 illustrates the open set (OS) when $Y^p_s = \emptyset$. FIGS. 5 and 6 illustrate the combination of partial domain adaptation and open set, differing in their position with respect to Y.

Used as the source domain classifier, the Coral classifier provides state of the art performance for ordinal source data. However the Coral classifier cannot address the combination partial domain adaptation and open set configurations. To address the combination partial domain adaptation and open set configurations, an auxiliary task of learning pairwise ordering relationship between images is introduced and applied to the combination partial domain adaptation and open set configurations.

Let $x_1$ and $x_2$ be two images belonging to classes in $Y_s$. Their ordering relationship is defined according to their classes as follows $$x_1 \prec x_2 \text{ if } y(x_1) \leq y(x_2) + \tau,$$

where $\tau$ is a gap threshold. It is noted that '$\prec$' is used for the instance ordering and '$\leq$' for the class order.

By the definition of class order, a target image $x_t$ is private if it is bigger or smaller than all source images. Hence, the order classifier is used to detect private target images and exclude the private target images from adversarial domain discrimination by assigning low weights. For the source domain, a similar approach is followed by weighting down classes detected as being private.

Let $p(x_t \prec D_s)$ denote the probability of target image $x_t$ to be smaller than all source images, $$p(x_t \prec D_s) = \mathop{\mathbb{E}}_{x_s \in D_s} \mathbb{1}(x_t \prec x_s),$$

where the indicator function $\mathbb{1}(\cdot)$ is 1 if the condition is satisfied, 0 otherwise. In the ideal case, when all order relationships $x_t \prec x_s$ are known, value 0 (or 1) of $p(x_t \prec D_s)$ means that $x_t$ is smaller (or bigger) than the source set and therefore is private. Instead, all intermediate values of $p(x_t \prec D_s)$ indicate that $x_t$ is in the common space Y. This binary decision can be expressed as $p(x_t \in Y) = \varepsilon(p(x_t \prec D_s))$ where $$\epsilon(x) = \begin{cases} 0 & \text{if } x \in \{0, 1\} \\ 1 & \text{otherwise.} \end{cases}$$

Symmetrically, $p(x_s \prec D_t)$ denotes the probability that a source image $x_s$ is smaller than all target images. A source class $y_s$ is private if all images of this class are bigger or smaller than all target images, $p(y_s \in Y^p_s) = \varepsilon(p(y_s \prec D_t))$, where $$p(y_s \prec D_t) = \mathop{\mathbb{E}}_{x_s, y(x_s) = y_s} p(x_s \prec D_t)$$

and $\varepsilon(\cdot)$ is the binary filter.

Figure 7:
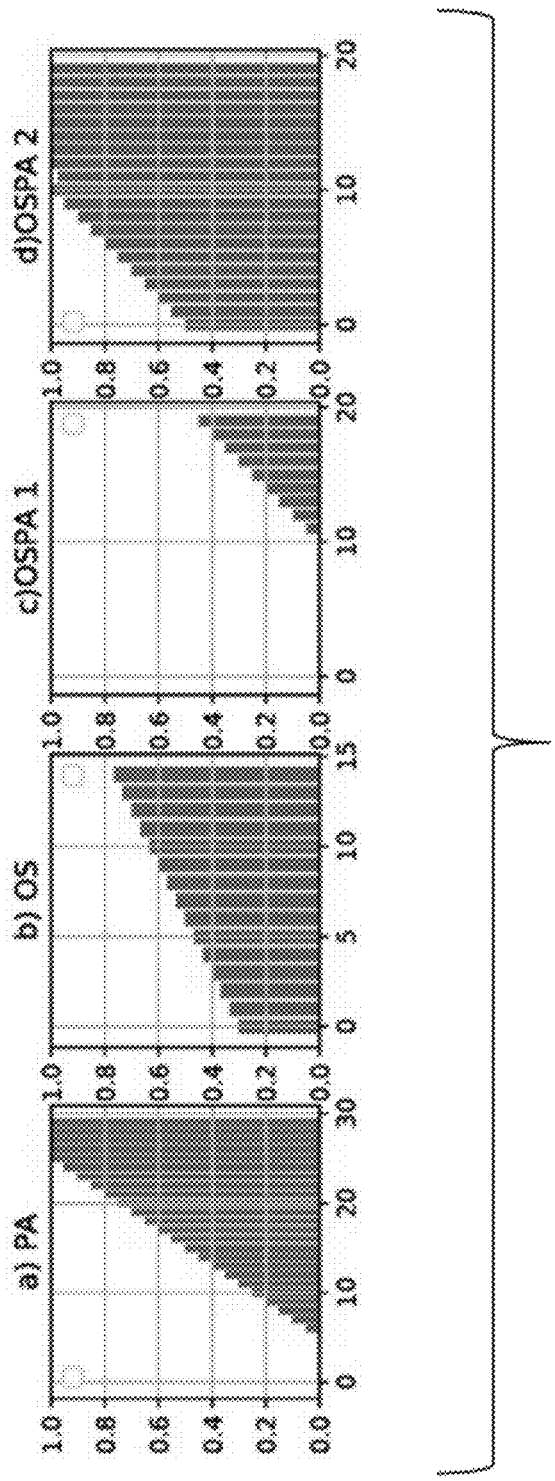
FIG. 7 represents a graphical representation of ideal $\rho(y_s \in Y)$ distributions for universal domain adaptation configuration.
Figure 8:
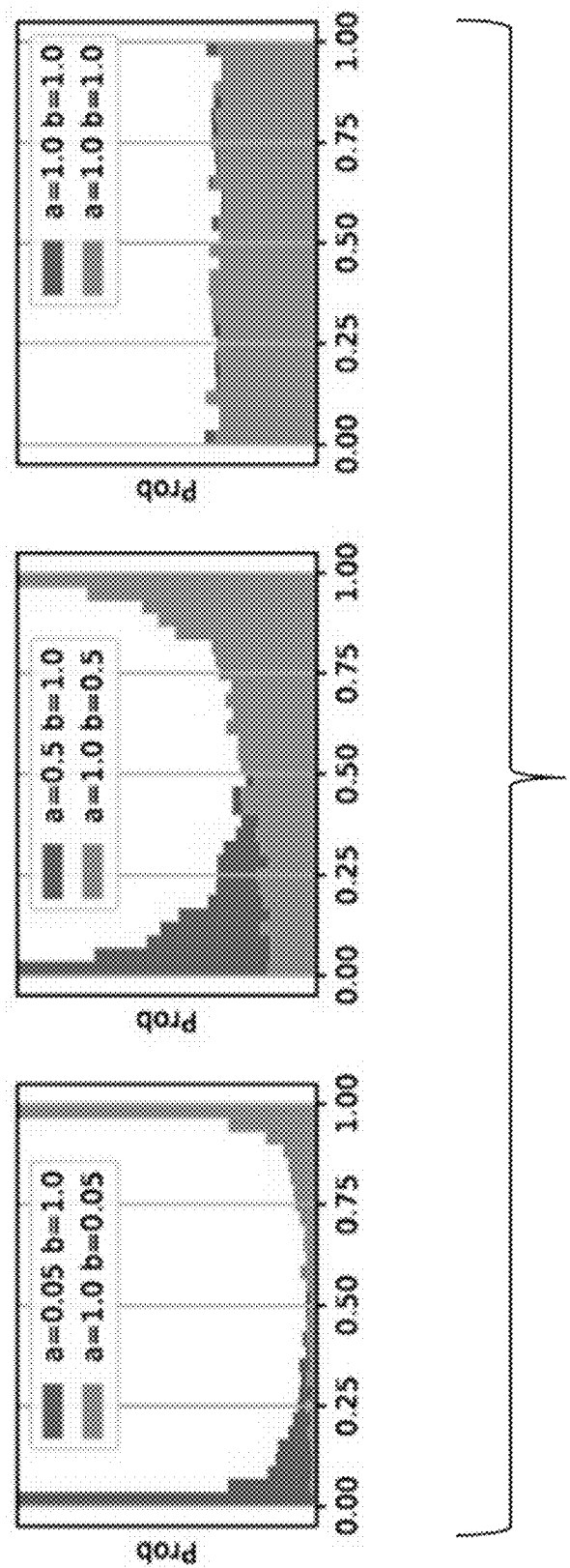
FIG. 8 represents a graphical representation of beta distribution functions $B(\alpha, 1.0)$ and $B(1.0, \alpha)$ for curriculum learning, $\alpha = 0.05, 0.5, 1.0$.

FIG. 7 illustrates the distribution plots of $p(y_s \prec D_t)$ for the four universal domain adaptation configurations illustrated in FIGS. 3-6, as applied to the corresponding class spans. In all cases, the distribution plots grow steadily within the common class range; the distribution plot is 0 before the first common class and 1 after the last common class.

A three-step scenario is defined for estimating if a target image $x_t$ or source class $y_s$ is in the common class set Y. First, a model is disposed to estimate the order relationship for any pair $(x_1, x_2)$. Second, $p(x_t \prec D_s)$ and $p(y_s \prec D_t)$ are estimated. Third, a binary filter is applied to estimate $p(x_t \in Y)$ and $p(y_s \in Y)$.

The scenario presented above assumed knowing all order relationships between source and target images. To adjust the scenario presented above, the order model is trained to estimate the probability $p(x_1 \prec x_2)$ with source images but do not expect it to be 100% accurate. To tolerate order errors, the binary filter is replaced with a smoothed filter $\tilde{e}(x)$ when x values are close to 0 and 1.

Figure 9:
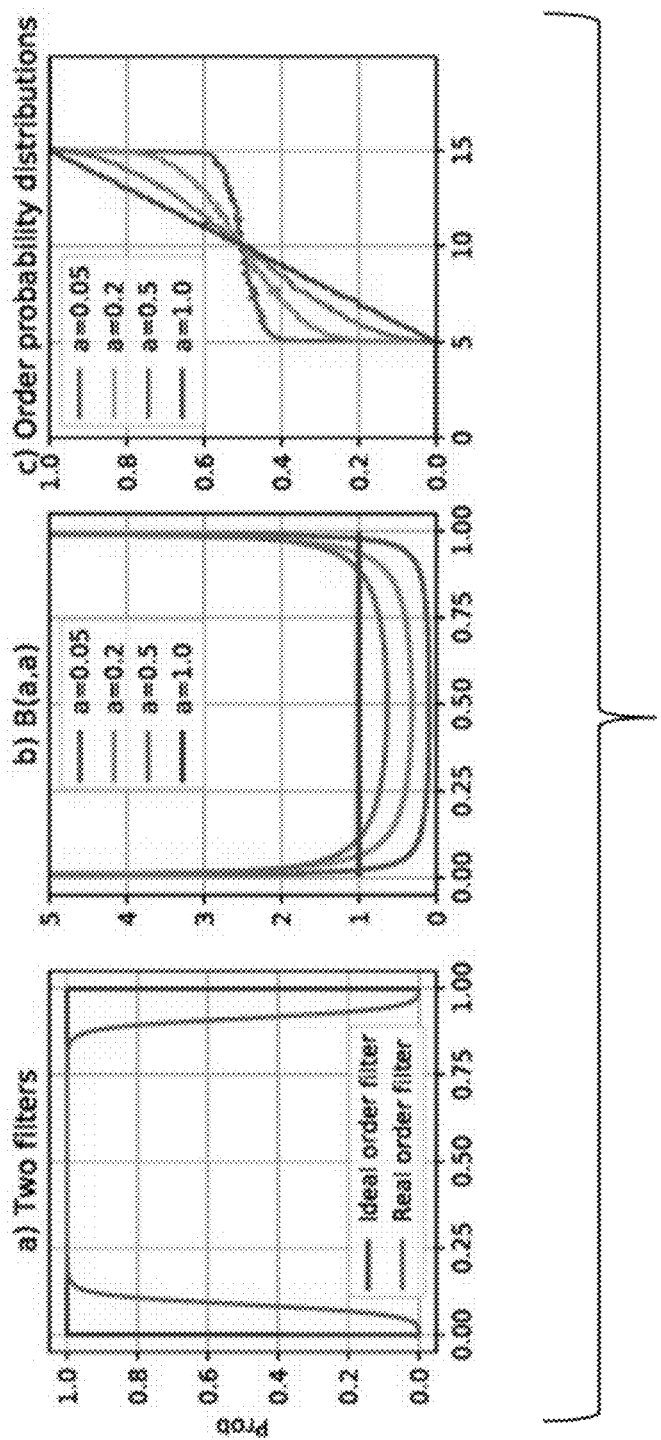
FIG. 9 represents graphical representations of a binary and smoothed filters, a beta function distributions $B(\alpha, \alpha)$, and a boundary learning for $p(x_t < D_s)$ distribution.

FIG. 9 illustrates in the first graph (Two filters) a plot of a binary filter and a smoothed filter implemented as a symmetric n-order Butterworth low-pass filter, widely used in signal processing.

It is noted that exhaustive enumeration of image pairs for training the order model is computationally expensive, thus, it is proposed to sample pairs instead and replace random sampling with a special strategy aimed at faster training.

Curriculum learning (CL) proceeds by presenting easy examples to the learner before hard ones. For age estimation, easy examples are those having a clear visual clue on which face is younger. Initially, image pairs having a big age difference are sampled with the symmetric L-shape and ⌐-shape distributions.

The sampling policy evolves over epochs by presenting harder pairs with smaller class difference. The sampling distribution at epoch ep is defined by Beta function, $B(\alpha, 1.0)$ for image $x_1$ and $B(1.0, \alpha)$ for image $x_2$, where $\alpha = 1 - \exp(ep)$. Symmetric distributions get flattened over epochs and tend to the uniform distribution $B(1, 1)$, as illustrated in FIG. 5. More specifically, FIG. 5 illustrates the Beta functions, $B(\alpha, 1.0)$ and $B(1.0, \alpha)$ for $\alpha = 0.05, 0.5$, and 1.

$p(x_t \prec D_s)$ can be estimated by randomly sampling/source images with the order model:

$$\hat{p}(x_t \prec D_s) = \mathbb{E}_{x_s \sim D_s} p(x_t \prec x_s)$$

However, under the imperfect order model, random sampling makes multiple errors when the target image is close to the common class boundaries. Inspired by curriculum learning for order learning, the U-shape sampling is applied to the target image weighting. Positioning a target image with respect to source boundary classes is more important than with respect to internal source ones. The U-shape is formalized as Beta function distribution, $B(\alpha, \alpha)$ scaled up to the source class range.

The third graph of FIG. 9 (Order probability distributions) shows $p(x_t \prec D_s)$ distribution for the open set case in FIG. 3 with 10 common classes and 10 private classes, and different values of $\alpha$. Small values of $\alpha$ sample images from boundary classes and form a plateau-like shape, thus reducing the sensitivity to the order errors. Unlike in curriculum learning, $\alpha$ does not change over epochs and equals 0.1.

The probability of source class $y_s$ to be common class as $p(y_s \in Y) = \tilde{e}(p(y_s \prec D_t))$, where $$p(y_s \prec D_t) = \mathbb{E}_{x_s, y(x_s) = y_s, x_t \sim D_t} p(x_s \prec x_t),$$

is the average over all images in class $y_s$. As target images are unlabeled, I target images are sampled randomly.

The ordinal regression universal domain adaptation network enables end-to-end training of a transferable feature extractor F, an ordinal regressor $G_r$ and order classifier $G_o$. Trained on labeled source images and unlabeled target images, the network enables an accurate adaptation of the source ordinal regression model to the target domain. A domain-level adversarial discriminator is adopted to reduce the discrepancy between domains and learn domain-invariant image representations.

The domain-invariant image representations $f = F(x)$ are learned in a minimax optimization procedure, where feature extractor F is trained by maximizing the loss of adversarial domain discriminator $G_d$, while $G_d$ is trained by minimizing the domain discrimination loss. The goal is to learn an ordinal regression model and transfer it to the target domain, while at the same time minimizing the loss of the source regressor $G_r$.

The order model is trained to separate common and private images in both domains and retain only common images for the domain discriminator.

The optimization problem is defined on three following losses. First, the ordinal regression loss is defined on labeled source images, $$\mathcal{L}_{or}(F, G_o) = \mathbb{E}_{x_i \in D_s} L_{coral}(G_r(F(x_i)), y_i),$$

where $L_{coral}$ is Coral loss.

Second, the order loss is defined on pairs of source images and their order relationships, $$\mathcal{L}_{ord}(F, G_o) = \mathbb{E}_{x_i, x_j \sim D_s} L_{ord}(G_o, F', x_i \prec x_j),$$

where $L_{ord}$ is the cross entropy loss, and F' compares the two image feature vectors. Instead of feature concatenation, vector difference, $F' = F(x_i) - F(x_j)$, has been implemented.

Third, adversarial domain discriminator $G_d$ is trained to distinguish between feature representations of the source and target images, with the adversarial loss $$\mathcal{L}_d = \mathbb{E}_{x_s \in D_s} w(x_s) \log G_d(F(x_s)) + \mathbb{E}_{x_t \in D_t} w(x_t) \log(1 - G_d(F(x_t))),$$

where weights $w(x_t)$ and $w(x_s)$ are obtained by target image weighting and source class weighting, $w(x_t) = p(x_t \in Y)$, $w(x_s) = p(x_s = \in Y) = p(y_s \in Y)$, $y_s = y(x_s)$.

The total loss for training the ordinal regression universal domain adaptation network is given as $$\mathcal{L}(F, G_r, G_o, G_d) = \mathcal{L}_{or}(F, G_r) + \gamma_1 \mathcal{L}_{ord}(F, G_o) + \gamma_2 \mathcal{L}_{dom}(F, G_d),$$

where $\gamma_1, \gamma_2$ are hyper-parameters controlling the importance of the order and domain discrimination adversarial losses. The training objective of the minimax game is the following:

$$F^*, G_r^*, G_o^* = \arg\min_{F, G_r, G_o} \max_{G_d} \mathcal{L}(F, G_r, G_o, G_d).$$

The above equation is solved by alternating between optimizing F, $G_r$, $G_o$, and $G_d$ until the total loss converges.

Figure 10:
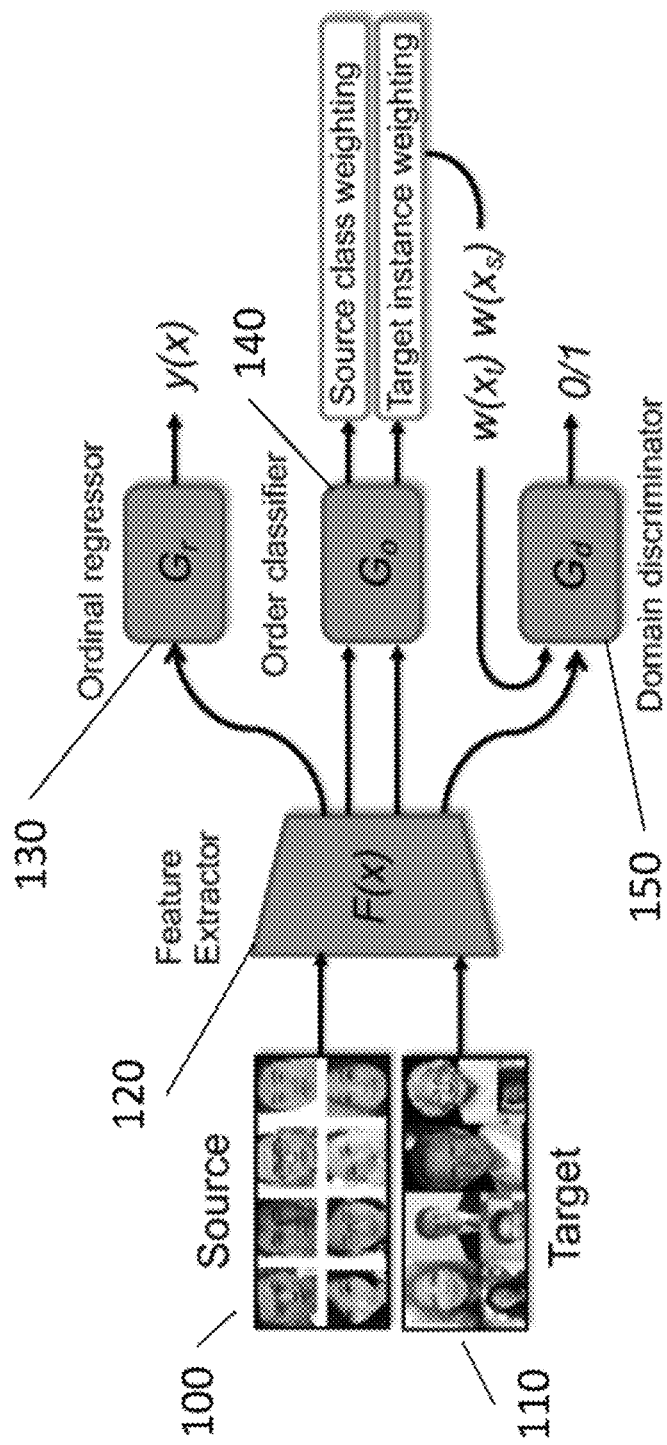
FIG. 10 illustrates an ordinal regression universal domain adaptation network architecture.

The ordinal regression universal domain adaptation architecture (network) is illustrated in FIG. 10. The network inputs a batch of source images 100 and a batch of target images 110. Feature extractor F 120 generates image representations f=F(x) for both batches. Domain discriminator $G_d$ 150 is trained on image representations f to distinguish between source images and target images. Ordinal regressor $G_r$ 130 is trained on a full set of source images, and the order classifier $G_o$ 140 is trained on a pairs of source images. Source and target image weights are updated over epochs using estimations of $p(x_t \in Y)$ and $p(x_s \in Y)$.

It is noted that the feature extractor F 120, the domain discriminator $G_d$ 150, ordinal regressor $G_r$ 130, and the order classifier $G_o$ 140 may be implemented by hardwired circuits, such as Application Specific Integrated Circuits (ASICs). The feature extractor F 120, the domain discriminator $G_d$ 150, ordinal regressor $G_r$ 130, and the order classifier $G_o$ 140 may be implemented by a combination of processor(s) and electronic memory, wherein the electronic memory electronically stores (permanently, temporarily, non-transitorily, or transitorily) computer-readable program code for carrying out the functions of the particular network.

Thus a network embodying the embodiments may involve one or more processing systems including, but not limited to, CPU, memory/storage devices, communication links, communication/transmitting devices, servers, I/O devices, or any subcomponents or individual parts of one or more processing systems, including software, firmware, hardware, or any combination or subcombination thereof, which embody the embodiments as set forth in the claims.

Figure 11:
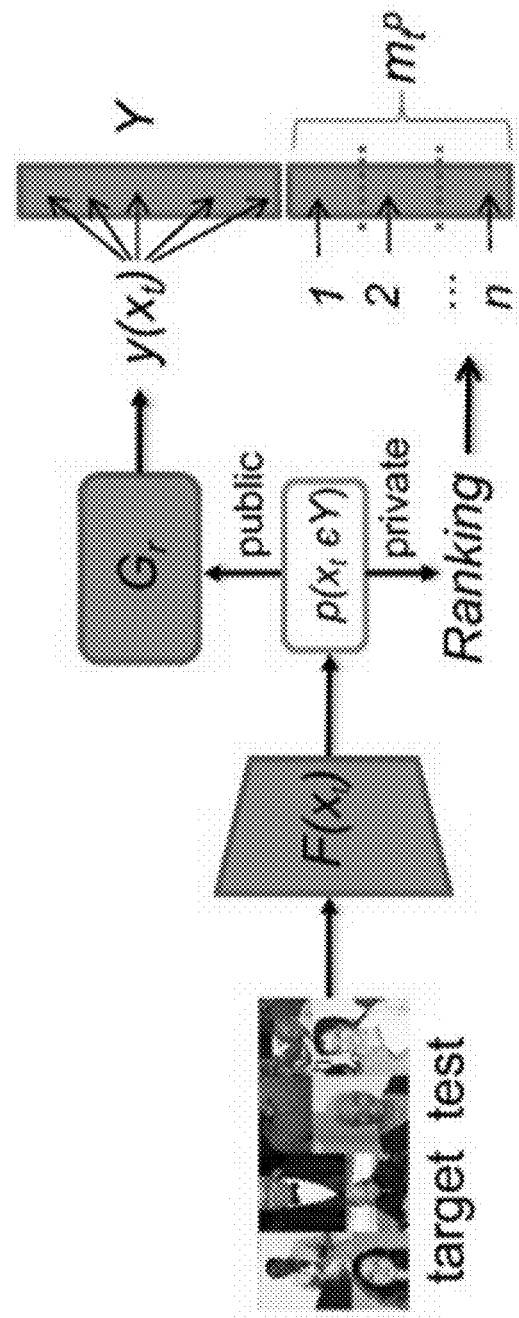
FIG. 11 illustrates target image evaluation with an image classification branch for the public part and an image ranking branch for the private par.

Once trained, the model is able to determine the public and private parts of the target domain. For images in the public part, the model can estimate their classes using the ordinal classifier, as illustrated in FIG. 11. In classification universal domain adaptation, all private target images are labeled as "unknown." However, an auxiliary order model can be applied to images in target private set and convert the pairwise values into the ranking.

Ranking problems involve a collection of n items, and some unknown underlying total ordering of these items. In many applications, noisy comparisons may be observed between various pairs of items. Examples include matches between teams in a football tournament and consumer's preference ratings. Given a set of noisy comparisons between items, any ranking method tries to find the true underlying ordering of all n items.

It is noted that finding approximate rankings based on noisy pairwise comparisons is a problem In particular, to rank the private target images, it is proposed to use the Bradley-Terry model, which is used in multiple applications. The Bradley-Terry model deals with pairwise comparisons among n images and assumes that there are positive quantities, $\pi$, i=1, . . . , n such that $p(x_i \prec x_j)=(\pi_i)/(\pi_i+\pi_j)$. Assuming independence of all comparisons, the probability $p_{ij}=p(x_j \prec x_j)$ satisfies the logit model:

$$\log\frac{p_{ij}}{1-p_{ij}} = \log\pi_j - \log\pi_i.$$

Then all parameters $\pi_i$ can be estimated by maximum likelihood using standard software for generalized linear models.

Image ranking corresponds to aligning private target images along the joint manifold, as an extension of the common class set Y, as illustrated in the graph labelled (Expansion by ranking) in FIG. 3. The target image ranked 1 is the closest to Y, while the target image ranked last is the farthest from Y.

The method classifies target images in the common part Y and ranks target images in the private part $Y_t^p$, as illustrated in FIG. 11. Consequently, the performance should be evaluated by three measures:

(1) Public/private image classification error;
(2) Mean square error (MAE) in common classes Y; and
(3) Ranking error of the private part.

The first and second measures are analogous to the classification universal domain adaptation, where classification error is measured on known classes in Y and "unknown" class to all images in $Y_t^p$. Instead, the ranking error is specific to ordinal regression universal domain adaptation, it estimates how the order model generalizes to target domain.

Estimating the ranking error is non obvious in ordinal regression, as classes with multiple images per class allow for an exponential number of valid rankings. To simplify the method evaluation, it is assumed that the number of classes in the private target part, $m^p_t=|Y_t^p|$, is known. This permits the converting of the ranking into private classes.

Since the class thresholds are unknown, the image ranking is split equally among $m^p_t$ classes, by simply following their order, as illustrated in FIG. 11. As a result, the mean square error can be measured on the entire target set, denoted as e-MAE. Note the number of private target classes is not used during the training, it is used in evaluation only.

The method was tested on three face age estimation datasets: (1) the Asian Face Dataset (AFAD), which includes 165,501 faces with age labels 15-40 years; (2) the UTKFace dataset, which includes 16,434 images with the age labels between 1 and 80 years; and (3) the CACD dataset, which total number of images is 159,449 in the age range 14-62 years.

Images in the CACD dataset are preprocessed such that the faces spanned the whole image with the nose tip being in the center. In UTKFace and AFAD datasets, the centered images were already provided.

Each image dataset is randomly divided into 80% training data and 20% test data. All images were resized to 128× 128×3 pixels and then randomly cropped to 120×120×3 pixels. During model evaluation, the 128×128×3 face images were center-cropped to a model input size of 120× 120×3.

During the training phase, all network components are trained jointly. The network inputs a batch of source images and a batch of target images to fine-tune F and to train $C_r$, $C_o$, and $C_d$. The curriculum learning changes the image sampling policy over epochs. Target image and source class weights are updated after each epoch.

During the testing phase, a target image $x_t$ is fed to the network. The order model compares it to $s_s$=50 source images. If it is detected as public, the ordinal regression classifier predicts its class as $C_o$ ($F(x_t)$). All target images detected as private are collected and post-processed for ranking.

Target pairs are sampled randomly, with at most $s_t$=100 comparisons per image. The Bradley-Terry method is used for all the pair-wise comparisons to rank the private images. For evaluation, a number $n'_p$ of private target classes is provided, and the image ranks are converted into the classes.

The network is trained using the Adam optimizer with a learning rate of $I_r=10^{-4}$ and a batch size of 64 images. Hyper-parameters $\gamma_1$ and $\gamma_2$ in the ordinal regression universal domain adaptation loss are set to 1.0. The symmetric Butterworth filter is configured with width $w_6$=0.9 and order $n_6=6$. The gap threshold for the order relationship is $\tau=3$. Training images are shuffled at each epoch before the images are fed to the network.

The effectiveness of the system is validated by ablating different components, measuring the corresponding errors, and comparing the errors to different baselines. e-MAE was used to measure the performance of universal domain adaptation methods.

FIG. 12 illustrates the evaluation results for four adaptation tasks on UTKFace and AFAD domains, corresponding to the different universal domain adaptation configurations in FIGS. 3-6. The first task combines partial domain adaptation and open set cases (FIGS. 5 and 6). The second and third tasks refer to the open set and partial domain adaptation configurations (FIGS. 3 and 4). The last task tests the same classes case.

For each task, the table shows the MAE for source domain (left) and the e-MAE for target domain (right). The table compares the ordinal regression universal domain adaptation performance to the source model transfer without adaptation, universal domain adaptation for classification, and supervised training.

Without adaptation, the Coral model is trained on source and tested on target data. The supervised model is trained on labeled target data and provides the upper bound any universal domain adaptation method would try to achieve.

As the table in FIG. 12 shows, the smaller values of $\xi$, the larger the performance gap between the supervised and no adaptation cases. The above discussed method tends to halve this gap in many tasks. Universal domain adaptation for classification fails to separate public and private parts and works well in same classes cases only. Like in classification, partial domain adaptation cases in ordinal regression appear easier than open set cases. The public/private classification error for target images grows from 2% for =1.0 to 35% for small $\xi$.

FIG. 13 illustrates evaluation results for four universal domain adaptation tasks on UTKFace-CACD and AFAD-CACD domain pairs. The table shows four universal domain adaptation configurations for each pair. For each task, the table compares the ordinal regression universal domain adaptation performance to the source model transfer without adaptation and supervised training.

The first universal domain adaptation configuration was used with AFAD and UTKFace to test the contribution of different components. First, beyond the e-MAE measure, the weighted version (we-MAE) was measured, where the image ranking was split into target private classes not equally, but according to their probabilities (unknown at training and used for evaluation only, like $m^p_t$). The table shows a small difference (0.12 on the average) that validates the equal split of image ranking into $m^p_t$ classes As shown in FIG. 14, the binary filter $\varepsilon(\cdot)$ used above severely impacts the performance. The binary filter $\varepsilon(\cdot)$ fails to discriminate private source and target images, places them in the common part, thus leading to the negative transfer.

However, when using the smoothed filter $\tilde{e}(\cdot)$, the smoothed filter $\tilde{e}(\cdot)$ helps find an optimal trade-off between false positives and false negatives. Curriculum learning and boundary learning help boost the order model performance, especially on starting epochs. The order classifier achieves 98% and 89% on the source train and test sets, respectively. The accuracy on the target test starts at 50% and grows to 76% at the end of training, due to domain invariant image representations.

Figure 15:
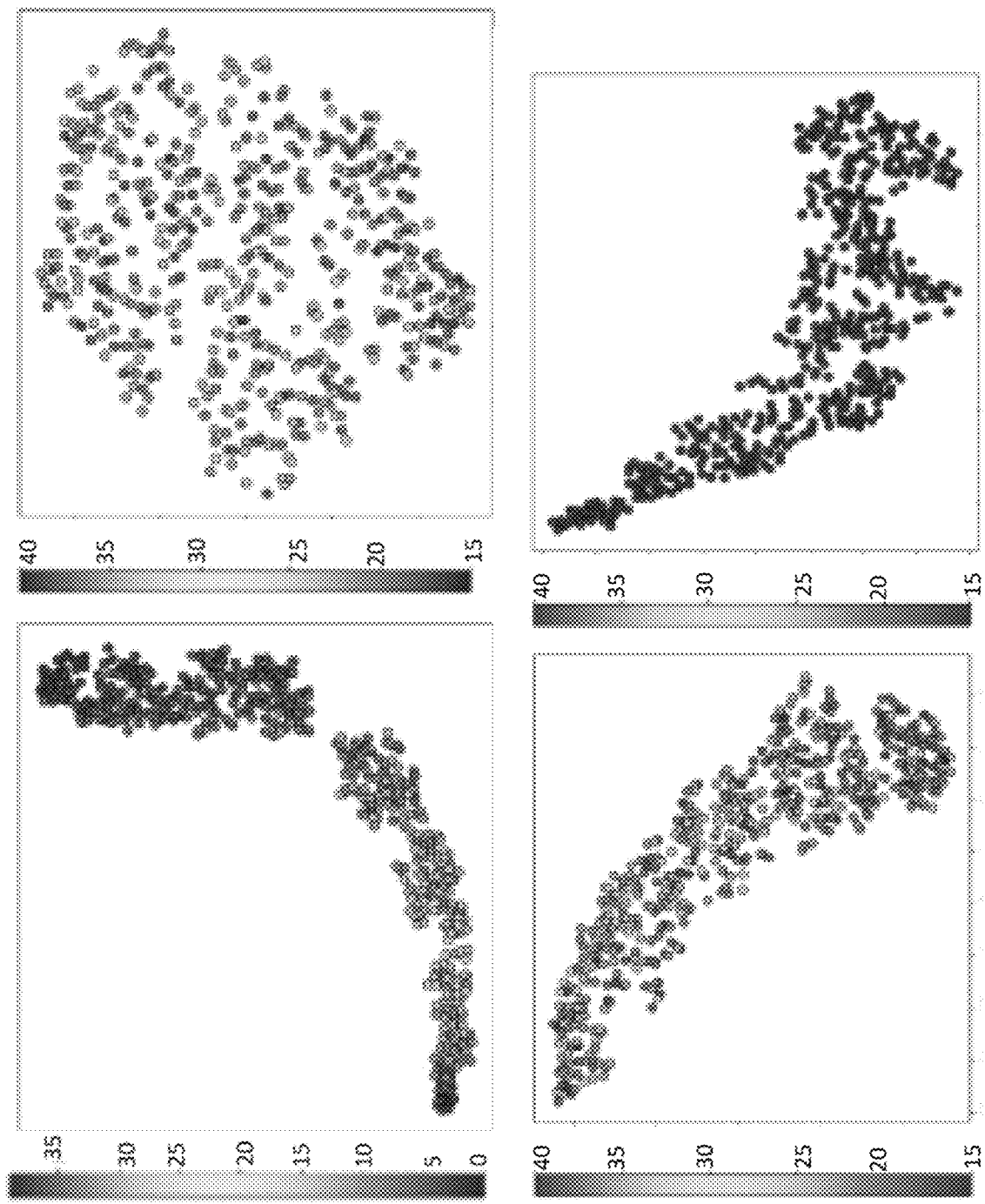
FIG. 15 represents graphical representations of TSN-E projections for UTKFace [0-40] to AFAD [15-40] adaptation.

FIG. 15 illustrates the plots of four TSN-E projections of image features $f=F(x)$ when adapting UTKFace [0-40] model to AFAD [15-40] domain (partial domain adaptation case). The first projection (graph) is a well formed manifold with a perfect class order, obtained by learning the ordinal regression model on source images. The second and third projections (graphs) show target images before and after domain adaptation, with a clearly formed manifold and better classification. The last projection (graph) is on the concatenation of source and target image features after adaptation. The various plots show how images from the two domains contribute to the common manifold.

Figure 16:
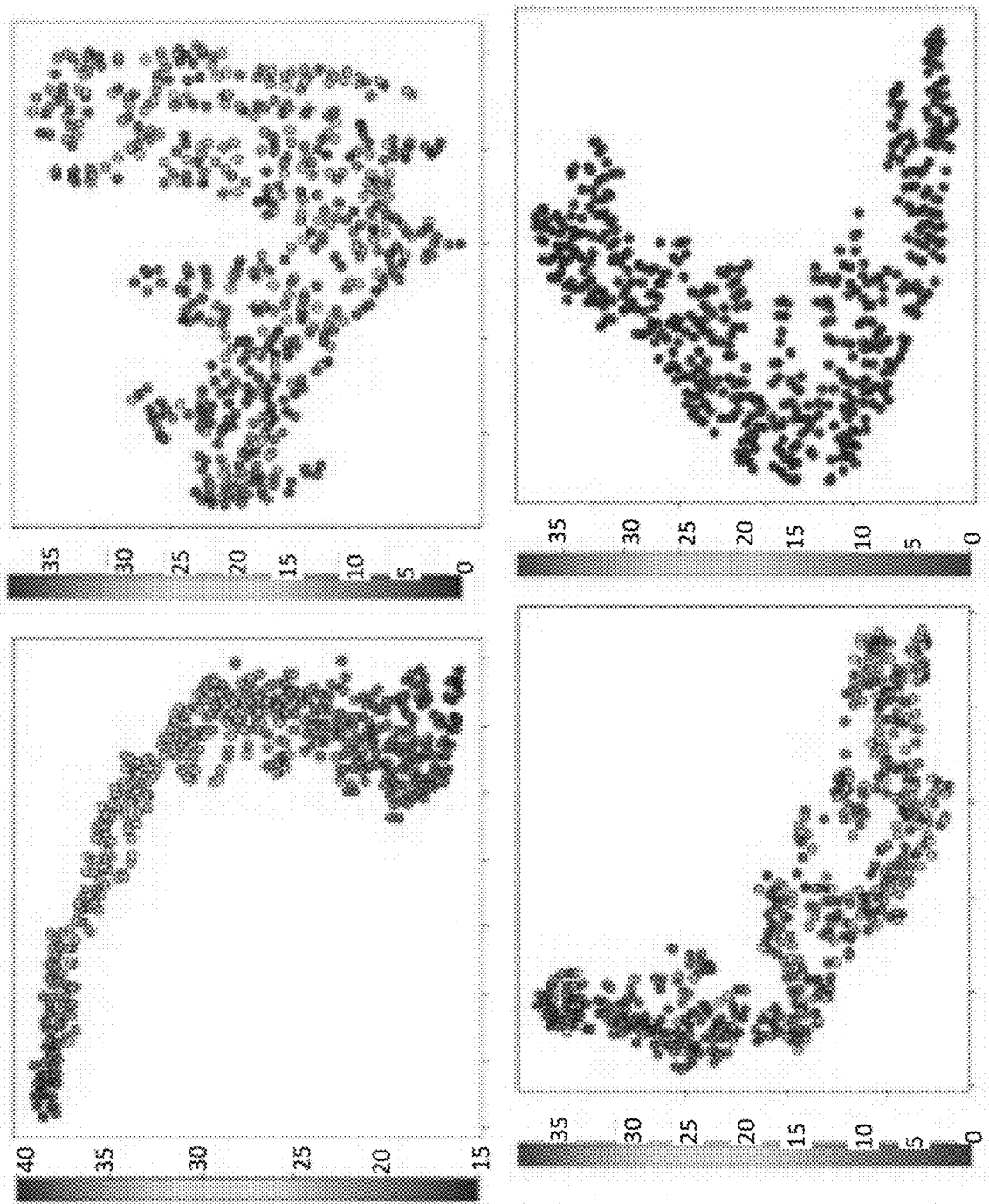

FIG. 16 illustrates plots of TSN-E projections of image features when the symmetric task of adapting AFAD [15-40] model to UTKFace [1-40] domain (open set case).

The above described process and system address the problem of universal domain adaptation in ordinal regression, which attempts to solve classification problems in which labels are not independent, but follow a natural order.

Instead of using the clustering assumption adopted by universal domain adaptation methods for classification and semantic segmentation, the above described process and system adopts the manifold assumption. In other words, the above described process and system complements the ordinal regression classifier with an auxiliary task of order learning which plays the double role of discriminating between common and private source and target instances, and also expanding labels on the implicit manifold.

First, the order model can be trained to discriminate between common and private instances, jointly with adversarial domain discrimination. Secondly, the order can expand the natural order to the private target label space on the manifold through ranking.

Thus, the above described process and system, combined with adversarial domain discrimination, is able to address all possible universal domain adaptation configurations.

The embodiments disclosed above may be implemented as a machine (or system), process (or method), or article of manufacture by using standard programming and/or engineering techniques to produce programming software, firmware, hardware, or any combination thereof. It will be appreciated that the flow diagrams described above are meant to provide an understanding of different possible embodiments. As such, alternative ordering of the steps, performing one or more steps in parallel, and/or performing additional or fewer steps may be done in alternative embodiments.

Any resulting program(s), having computer-readable program code, may be embodied within one or more computer-readable media such as memory devices or transmitting devices, thereby making a computer program product or article of manufacture according to the embodiments. As such, the terms "article of manufacture" and "computer program product" as used herein are intended to encompass a computer program existent (permanently, temporarily, non-transitorily, or transitorily) on any computer-readable medium such as on any memory device or in any transmitting device.

A machine embodying the embodiments may involve one or more processing systems including, but not limited to, CPU, memory/storage devices, communication links, communication/transmitting devices, servers, I/O devices, or any subcomponents or individual parts of one or more processing systems, including software, firmware, hardware, or any combination or subcombination thereof, which embody the embodiments as set forth in the claims.

An ordinal regression unsupervised domain adaption network for jointly training of a transferable feature extractor network, an ordinal regressor network, and an order classifier network, comprises a source of labeled source images and unlabeled target images; a transferable feature extractor network, operatively connected to the source of labeled source images and unlabeled target images, to output image representations, the image representations being realized by a minimax optimization procedure; a domain discriminator network operatively connected to the transferable feature extractor network; an ordinal regressor network operatively connected to the transferable feature extractor network; and an order classifier network operatively connected to the transferable feature extractor network and the domain discriminator network; the domain discriminator network being trained, using the image representations from the transferable feature extractor network, to distinguish between source images and target images; the ordinal regressor network being trained, using a full set of source images from the transferable feature extractor network; the order classifier network being trained, using a pair of source images from the transferable feature extractor network.

The transferable feature extractor network may be trained by maximizing a loss of the domain discriminator.

A total loss for training the ordinal regression universal domain adaptation network may be given as:

$$\mathcal{L}(F, G_r, G_o, G_d) = \mathcal{L}_{or}(F, G_r) + \gamma_1 \mathcal{L}_{ord}(F, G_o) + \gamma_2 \mathcal{L}_{dom}(F, G_d),$$

$\gamma_1$, $\gamma_2$ are hyper-parameters controlling an importance of order and domain discrimination adversarial losses; wherein $$F^*, G_r^*, G_o^* = \arg\min_{F, G_r, G_o} \max_{G_d} \mathcal{L}(F, G_r, G_o, G_d)$$

is solved by alternating between optimizing F, $G_r$, $G_o$, and $G_d$ until the total loss converges.

The loss for the ordinal regressor network may be defined on labeled source images $$\mathcal{L}_{or}(F, G_o) = \mathop{\mathbb{E}}_{x_i \in D_s} L_{coral}(G_r(F(x_i)), y_i),$$

where $L_{coral}$ is Coral loss.

The loss for the order classifier network may be defined on pairs of source images and order relationships thereof, $$\mathcal{L}_{ord}(F, G_o) = \mathop{\mathbb{E}}_{x_i, x_j \sim D_s} L_{ord}(G_o, F', x_i < x_j),$$

where $L_{ord}$ is the cross entropy loss, and F' compares the two image feature vectors.

The loss for the domain discriminator network may be $$\mathcal{L}_d = \mathbb{E}_{x_s \in D_s} w(x_s) \log G_d(F(x_s)) + \mathbb{E}_{x_t \in D_t} w(x_t) \log(1 - G_d(F(x_t))),$$

where weights $w(x_t)$ and $w(x_s)$ are obtained by target image weighting and source class weighting, $w(x_t)=p(x_t \in Y)$, $w(x_s)=p(x_s \in Y)=p(y_s \in Y)$, $y_s=y(x_s)$.

A method of jointly training of a transferable feature extractor network, an ordinal regressor network, and an order classifier network in an ordinal regression unsupervised domain adaption network, comprises (a) providing a source of labeled source images and unlabeled target images; (b) outputting image representations from a transferable feature extractor network by performing a minimax optimization procedure on the source of labeled source images and unlabeled target images; (c) training a domain discriminator network, using the image representations from the transferable feature extractor network, to distinguish between source images and target images; (d) training an ordinal regressor network using a full set of source images from the transferable feature extractor network; and (e) training an order classifier network using a full set of source images from the transferable feature extractor network.

The method may further comprise (f) training the transferable feature extractor network by maximizing a loss of the domain discriminator.

A total loss for training the ordinal regression universal domain adaptation network may be given as:

$$\mathcal{L}(F, G_r, G_o, G_d) = \mathcal{L}_{or}(F, G_r) + \gamma_1 \mathcal{L}_{ord}(F, G_o) + \gamma_2 \mathcal{L}_{dom}(F, G_d),$$

$\gamma_1$, $\gamma_2$ are hyper-parameters controlling an importance of order and domain discrimination adversarial losses; wherein $$F^*, G_r^*, G_o^* = \arg\min_{F, G_r, G_o} \max_{G_d} \mathcal{L}(F, G_r, G_o, G_d)$$

is solved by alternating between optimizing F, $G_r$, $G_o$, and $G_d$ until the total loss converges.

The the loss for the ordinal regressor network may be defined on labeled source images, $$\mathcal{L}_{or}(F, G_o) = \mathop{\mathbb{E}}_{x_i \in D_s} L_{coral}(G_r(F(x_i)), y_i),$$

where $L_{coral}$ is Coral loss.

The loss for the order classifier network may be defined on pairs of source images and order relationships thereof, $$\mathcal{L}_{ord}(F, G_o) = \mathop{\mathbb{E}}_{x_i, x_j \sim D_s} L_{ord}(G_o, F', x_i < x_j),$$

where $L_{ord}$ is the cross entropy loss, and F' compares the two image feature vectors.

The loss for the domain discriminator network may be $$\mathcal{L}_d = \mathbb{E}_{x_s \in D_s} w(x_s) \log G_d(F(x_s)) +$$
$$\mathbb{E}_{x_t \in D_t} w(x_t) \log(1 - G_d(F(x_t))),$$

where weights $w(x_t)$ and $w(x_s)$ are obtained by target image weighting and source class weighting, $w(x_t)=p(x_t \in Y)$, $w(x_s)=p(x_s \in Y)=p(y_s \in Y)$, $y_s=y(x_s)$.

It will be appreciated that variations of the above-disclosed embodiments and other features and functions, or alternatives thereof, may be desirably combined into many other different systems or applications. Also, various presently unforeseen or unanticipated alternatives, modifications, variations, or improvements therein may be subsequently made by those skilled in the art which are also intended to be encompassed by the description above and the following claims.

What is claimed is:

1. An ordinal regression unsupervised domain adaption network for jointly training of a transferable feature extractor network, an ordinal regressor network, and an order classifier network, comprising:
- a source of labeled source images and unlabeled target images;
- a transferable feature extractor network, operatively connected to said source of labeled source images and unlabeled target images, to output image representations, said image representations being realized by a minimax optimization procedure;
- a domain discriminator network operatively connected to said transferable feature extractor network;
- an ordinal regressor network operatively connected to said transferable feature extractor network; and
- an order classifier network operatively connected to said transferable feature extractor network and said domain discriminator network;
- said domain discriminator network being trained, using said image representations from said transferable feature extractor network, to distinguish between source images and target images;
- said ordinal regressor network being trained, using a full set of source images from said transferable feature extractor network;
- said order classifier network being trained, using a pair of source images from said transferable feature extractor network.

2. The ordinal regression unsupervised domain adaption network as claimed in claim 1, wherein said transferable feature extractor network is trained by maximizing a loss of said domain discriminator.

3. The ordinal regression unsupervised domain adaption network as claimed in claim 1, wherein a total loss for training the ordinal regression universal domain adaptation network is given as:

$$\mathcal{L}(F, G_r, G_o, G_d) = \mathcal{L}_{or}(F, G_r) + \gamma_1 \mathcal{L}_{ord}(F, G_o) + \gamma_2 \mathcal{L}_{dom}(F, G_d),$$

$\gamma_1, \gamma_2$ are hyper-parameters controlling an importance of order and domain discrimination adversarial losses; wherein $$F^*, G_r^*, G_o^* = \arg\min_{F, G_r, G_o} \max_{G_d} \mathcal{L}(F, G_r, G_o, G_d)$$

is solved by alternating between optimizing F, $G_r$, $G_o$, and $G_d$ until the total loss converges.

4. The ordinal regression unsupervised domain adaption network as claimed in claim 3, wherein the loss for said ordinal regressor network is defined on labeled source images, $$\mathcal{L}_{or}(F, G_o) = \mathbb{E}_{x_i \in D_s} L_{coral}(G_r(F(x_i)), y_i),$$

where $L_{coral}$ is Coral loss.

5. The ordinal regression unsupervised domain adaption network as claimed in claim 3, wherein the loss for said order classifier network is defined on pairs of source images and order relationships thereof, $$\mathcal{L}_{ord}(F, G_o) = \mathbb{E}_{x_i, x_j \sim D_s} L_{ord}(G_o, F', x_i \prec x_j),$$

where $L_{ord}$ is the cross entropy loss, and F' compares the two image feature vectors.

6. The ordinal regression unsupervised domain adaption network as claimed in claim 3, wherein the loss for said domain discriminator network is $$\mathcal{L}_d = \mathbb{E}_{x_s \in D_s} w(x_s) \log G_d(F(x_s)) +$$
$$\mathbb{E}_{x_t \in D_t} w(x_t) \log(1 - G_d(F(x_t))),$$

where weights $w(x_t)$ and $w(x_s)$ are obtained by target image weighting and source class weighting, $w(x_t) = p(x_t \in Y)$, $w(x_s) = p(x_s \in Y) = p(y_s \in Y)$, $y_s = y(x_s)$.

7. A method of jointly training of a transferable feature extractor network, an ordinal regressor network, and an order classifier network in an ordinal regression unsupervised domain adaption network, comprising:
(a) providing a source of labeled source images and unlabeled target images;
(b) outputting image representations from a transferable feature extractor network by performing a minimax optimization procedure on the source of labeled source images and unlabeled target images;
(c) training a domain discriminator network, using the image representations from the transferable feature extractor network, to distinguish between source images and target images;
(d) training an ordinal regressor network using a full set of source images from the transferable feature extractor network; and
(e) training an order classifier network using a full set of source images from said transferable feature extractor network.

8. The method as claimed in claim 7, further comprising:
(f) training the transferable feature extractor network by maximizing a loss of the domain discriminator.

9. The method as claimed in claim 7, wherein a total loss for training the ordinal regression universal domain adaptation network is given as:

$$\mathcal{L}(F, G_r, G_o, G_d) = \mathcal{L}_{or}(F, G_r) + \gamma_1 \mathcal{L}_{ord}(F, G_o) + \gamma_2 \mathcal{L}_{dom}(F, G_d),$$

$\gamma_1, \gamma_2$ are hyper-parameters controlling an importance of order and domain discrimination adversarial losses; wherein $$F^*, G_r^*, G_o^* = \arg\min_{F, G_r, G_o} \max_{G_d} \mathcal{L}(F, G_r, G_o, G_d)$$

is solved by alternating between optimizing F, $G_r$, $G_o$, and $G_d$ until the total loss converges.

10. The method as claimed in claim 9, wherein the loss for the ordinal regressor network is defined on labeled source images, $$\mathcal{L}_{or}(F, G_o) = \mathop{\mathbb{E}}_{x_i \in D_s} L_{coral}(G_r(F(x_i)), y_i),$$

where $L_{coral}$ is Coral loss.

11. The method as claimed in claim 9, wherein the loss for the order classifier network is defined on pairs of source images and order relationships thereof, $$\mathcal{L}_{ord}(F, G_o) = \mathop{\mathbb{E}}_{x_i, x_j \sim D_s} L_{ord}(G_o, F', x_i \prec x_j),$$

where $L_{ord}$ is the cross entropy loss, and F compares the two image feature vectors.

12. The ordinal regression unsupervised domain adaption network as claimed in claim 9, wherein the loss for the domain discriminator network is $$\mathcal{L}_d = \mathbb{E}_{x_s \in D_s} w(x_s) \log G_d(F(x_s)) +$$
$$\mathbb{E}_{x_t \in D_t} w(x_t) \log(1 - G_d(F(x_t))),$$

where weights $w(x_t)$ and $w(x_s)$ are obtained by target image weighting and source class weighting, $w(x_t) = p(x_t \in Y)$, $w(x_s) = p(x_s \in Y) = p(y_s \in Y)$, $y_s = y(x_s)$.

* * * * *